(12) United States Patent
Zhou et al.

(10) Patent No.: US 10,723,929 B2
(45) Date of Patent: Jul. 28, 2020

(54) THINNER FOR OIL-BASED DRILLING FLUIDS

(71) Applicant: CNPC USA CORPORATION, Houston, TX (US)

(72) Inventors: Chun Zhou, Sugar Land, TX (US); Jiancheng Li, Panjin (CN); Burhan Hoxha, Houston, TX (US); Stephanie Yu, Houston, TX (US)

(73) Assignee: CNPC USA CORPORATION, Houston, TX (US)

( * ) Notice: Subject to any disclaimer, the term of this patent is extended or adjusted under 35 U.S.C. 154(b) by 122 days.

(21) Appl. No.: 15/061,175

(22) Filed: Mar. 4, 2016

(65) Prior Publication Data

US 2017/0145281 A1 May 25, 2017

Related U.S. Application Data

(63) Continuation-in-part of application No. 14/945,697, filed on Nov. 19, 2015.

(51) Int. Cl.
| | |
|---|---|
| *C09K 8/035* | (2006.01) |
| *C09K 8/34* | (2006.01) |
| *E21B 7/00* | (2006.01) |
| *E21B 21/06* | (2006.01) |

(52) U.S. Cl.
CPC .............. *C09K 8/035* (2013.01); *C09K 8/34* (2013.01); *E21B 7/00* (2013.01); *E21B 21/062* (2013.01); *E21B 21/065* (2013.01)

(58) Field of Classification Search
CPC . C09K 8/36; C09K 8/035; C09K 8/34; C09K 8/28; C09K 8/32; C09K 8/52; C09K 8/64; C09K 8/03; C09K 8/82; C09K 2208/18; C09K 8/12; C09K 8/40; C09K 8/50; C09K 8/506; C09K 8/685; C09K 8/032; C09K 2208/02; C09K 2208/24; C09K 2208/34; C09K 3/32; C09K 8/02; C09K 8/22; C09K 8/26; C09K 8/42; C09K 8/467; C09K 8/524; C09K 8/528; C09K 8/584; C09K 8/725; C09K 8/882; C09K 8/887; C09K 3/00; C09K 8/04; C09K 8/08; C09K 8/20; C09K 8/265; C09K 8/44; C09K 8/516; C09K 8/74; E21B 21/068; E21B 21/066; E21B 33/138; E21B 43/025; E21B 21/00; E21B 21/06; E21B 21/062
See application file for complete search history.

(56) References Cited

U.S. PATENT DOCUMENTS

| | | | | |
|---|---|---|---|---|
| 4,508,628 A | * | 4/1985 | Walker ................. | C09K 8/36 507/129 |
| 7,638,466 B2 | | 12/2009 | Mueller et al. | |
| 9,587,162 B2 | | 3/2017 | Fisk, Jr. | |
| 2013/0079536 A1 | | 3/2013 | Chen et al. | |
| 2014/0121135 A1 | * | 5/2014 | Gamage ................. | C09K 8/36 507/131 |

FOREIGN PATENT DOCUMENTS

CN 105017497 * 11/2015

OTHER PUBLICATIONS

Power et al., Drilling Fluid Yield Stress: Measurement Techniques for Improved Understanding of Critical Drilling Fluid Parameters, AADE-03-NTCE-35, 2003, American Association of Drilling Engineers, 2003 AADE Technical Conference.

* cited by examiner

*Primary Examiner* — Kumar R Bhushan
(74) *Attorney, Agent, or Firm* — Ramey & Schwaller, LLP; William P. Ramey; Melissa S. Schwaller

(57) ABSTRACT

A thinner that is a poly fatty amide reacted with maleic acid to form a product, and diluting the product with a compound selected from the group consisting of oleyl alcohol, fatty acid, and poly condensed fatty acid is able to reduce the viscosity of oil-based drilling fluid, thus allowing for reuse of the oil-based drilling fluid.

1 Claim, 4 Drawing Sheets

THINNER FOR OIL-BASED DRILLING FLUIDS

RELATED APPLICATIONS

This application is a continuation-in part application of U.S. Nonprovisional application Ser. No. 14/945,697 filed Nov. 19, 2015, incorporated by reference.

FIELD

The disclosure relates generally to oil production. The disclosure relates specifically to oil-based drilling fluids.

BACKGROUND

The viscosity of oil-based drilling fluid (mud) is higher after it returns to the surface than when it was injected in the wellbore due to a high solid content. Drill cuttings are transported to the surface in the drilling fluid. If a drilling fluid is too viscous, it will be difficult to pump. During drilling, after reaching the surface, the cuttings can be separated from the drilling fluid and the drilling fluid can be recirculated and reused. A settling pit can be used to separate the cuttings from the drilling fluid. If the solid particles are too fine (e.g., less than 0.1 nm), they may remain in suspension in the drilling fluid. The presence of the solid particles cause increased drilling fluid viscosity and gel strengths.

It would be advantageous to have a thinner that can be added to oil-based drilling fluid to reduce the viscosity of the oil-based drilling fluid after it returns to the surface so that the fluid can be reused.

SUMMARY

An embodiment of the disclosure is a method of decreasing viscosity of an oil-based drilling fluid composition comprising adding a thinner to the oil-based drilling fluid to form an oil-based drilling fluid composition; wherein the thinner is produced by reacting a poly fatty amide with maleic acid to form a product, and diluting the product with a compound selected from the group consisting of oleyl alcohol, fatty acid, and poly condensed fatty acid; injecting the oil-based drilling fluid composition into a wellbore; and retrieving the oil-based drilling fluid composition as it returns to the surface. In an embodiment, the oil-based drilling fluid composition is reusable after being retrieved from the wellbore. In an embodiment, the thinner is present in a range of 0.03-1.6%. In an embodiment, the poly fatty amide is made from fatty acid or oil reacted with polyamines. In an embodiment, the poly fatty amide is made from fatty acid or oil reacted with polyamines at a temperature range of 100-200° C. In an embodiment, the poly fatty amide is reacted with maleic acid at a temperature range of between about 80-150° C. In an embodiment, the oleyl alcohol, fatty acid, and poly condensed fatty acid are in the range of about 40% to 100%. In an embodiment, steps a)-c) are repeated. In an embodiment, the temperature of the wellbore is between about 150-320° C. In an embodiment, the temperature of the wellbore is between about 200-270° C. In an embodiment, the temperature of the wellbore is between about 220-250° C. In an embodiment, viscosity of the oil-based drilling fluid composition after addition of the thinner is decreased by up to 75% of the yield point in comparison to viscosity of the oil-based drilling fluid before addition of the thinner. In an embodiment, in viscosity of the oil-based drilling fluid composition after addition of the thinner is decreased by up to 50% of the yield point in comparison to viscosity of the oil-based drilling fluid before addition of the thinner. In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers. In an embodiment, the oil-based drilling fluid composition has a density as high as 2.8 specific gravity.

An embodiment of the disclosure is an oil-based drilling fluid composition comprising a thinner wherein the thinner is produced by reacting a poly fatty amide with maleic acid, and diluting with a compound selected from the group consisting of oleyl alcohol, fatty acid, and poly condensed fatty acid; wherein the thinner is present at a concentration effective to decrease by up to 25% of the yield point in comparison to the viscosity of the oil-based drilling fluid before addition of the thinner; and wherein the oil-based drilling fluid composition is reusable after being retrieved from a wellbore. In an embodiment, the thinner is present in a range of 0.03-1.6%. In an embodiment, the poly fatty amide is made from fatty acid or oil reacted with polyamines. In an embodiment, the poly fatty amide is made from fatty acid or oil reacted with polyamines at a temperature range of 100-200° C. In an embodiment, the poly fatty amide is reacted with maleic acid at a temperature range of between about 80-150° C. In an embodiment, rein the oleyl alcohol, fatty acid, and poly condensed fatty acid are in the range of about 40% to 100%. In an embodiment, the temperature of the wellbore is between about 150-320° C. In an embodiment, the temperature of the wellbore is between about 220-250° C. In an embodiment, viscosity of the oil-based drilling fluid composition after addition of the thinner is decreased by up to 75% of the yield point in comparison to viscosity of the oil-based drilling fluid before addition of the thinner. In an embodiment, viscosity of the oil-based drilling fluid composition after addition of the thinner is decreased by up to 50% of the yield point in comparison to viscosity of the oil-based drilling fluid before addition of the thinner. In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers. In an embodiment, the oil-based drilling fluid composition has a density as high as 2.8 specific gravity.

An embodiment of the disclosure is a wellbore comprising an oil-based drilling fluid composition comprising a thinner produced by reacting a poly fatty amide with maleic acid, and diluting with a compound selected from the group consisting of oleyl alcohol, fatty acid, and poly condensed fatty acid; wherein the thinner is present at a concentration effective to decrease by up to 25% of the yield point in comparison to the viscosity of the oil-based drilling fluid before addition of the thinner; and wherein the oil-based drilling fluid composition is reusable after being retrieved from the wellbore. In an embodiment, the thinner is present in a range of 0.03-1.6%. In an embodiment, the poly fatty amide is made from fatty acid or oil reacted with polyamines. In an embodiment, n the poly fatty amide is made from fatty acid or oil reacted with polyamines at a temperature range of 100-200° C. In an embodiment, the poly fatty amide is reacted with maleic acid at a temperature range of between about 80-150° C. In an embodiment, the oleyl alcohol, fatty acid, and poly condensed fatty acid are in the range of about 40% to 100%. In an embodiment, the temperature of the wellbore is between about 150-320° C. In an embodiment, the temperature of the wellbore is between about 220-250° C. In an embodiment, viscosity of the oil-based drilling fluid composition after addition of the thinner is decreased by up to 75% of the yield point in comparison to viscosity of the oil-based drilling fluid before addition of the thinner. In an embodiment, viscosity of the oil-based drilling fluid composition after addition of the thinner is decreased by up to 50% of the yield point in comparison to viscosity of the oil-based drilling fluid before addition of the thinner. In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers. In an embodiment, the oil-based drilling fluid composition has a density as high as 2.8 specific gravity.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
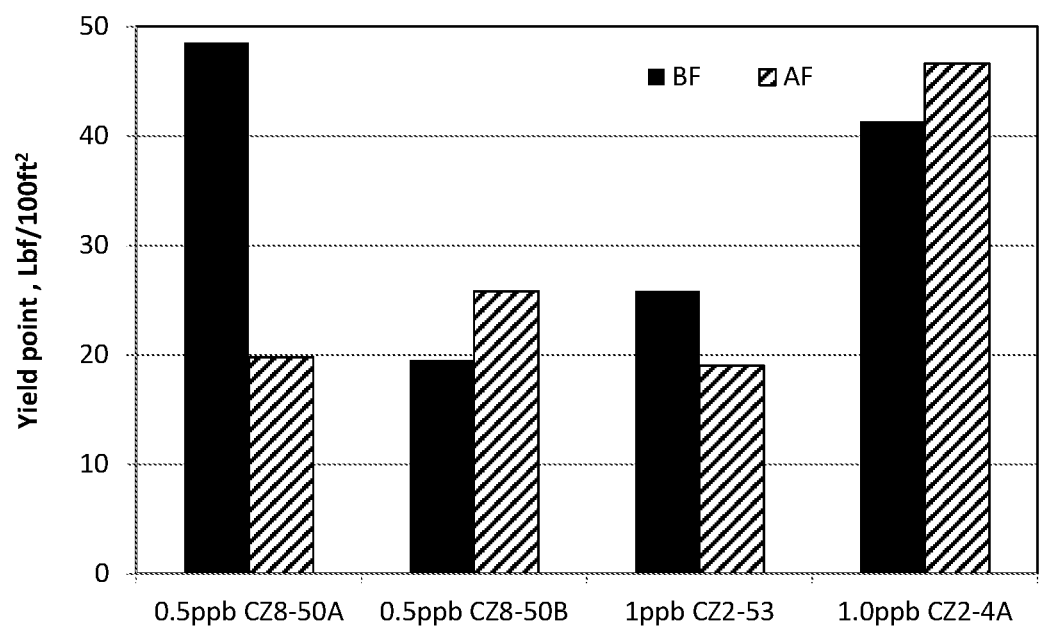
FIG. 1 plots the yield point comparison of before (BF) and after (AF) addition of various thinner candidates.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "viscosity" means and refers to the property of a fluid that resists the force tending to cause the fluid to flow. Viscosity is a quantity expressing the magnitude of internal friction, as measured by the force per unit area resisting a flow in which parallel layers unit distance apart have unit speed relative to one another.

As used herein, the term "thinner" means and refers to a deflocculant, an agent used to reduce viscosity or prevent flocculation. Flocculation is the process in which fine particles aggregate together.

As used herein, the term "dispersant" means and refers to a chemical that aids in breaking up solids or liquids as fine particles or droplets into another medium.

Oil-based mud viscosity rises too high after returning to surface. A thinner can be used to decrease the viscosity of the oil-based mud. Different thinners may function better at low temperatures or high temperatures. In an embodiment, various thinners provide a decrease in viscosity at low temperatures. In an embodiment, low temperature thinners are used at a temperature range of about 22-180° C. In an embodiment, low temperature thinners are used at a temperature range of about 130-180° C. In an embodiment, various thinners provide a decrease in viscosity at a high temperatures. In an embodiment, high temperature thinners are used at a temperature of about 22-250° C. In an embodiment, high temperature thinners are used at a temperature of about 220-250° C.

A high temperature thinner can be used in an oil-based mud, especially in an invert emulsion drilling fluid. The thinner and the drilling fluid it is in can be stable at temperatures up to 220-250° C. The drilling fluid composition can have a density in the range of about 2.4 to 2.8 specific gravity. In an embodiment, the drilling fluids formulated can have a density in the range of about 2.0 to 2.4 specific gravity. In an embodiment, the drilling fluids formulated can have a density in the range of about 1.5 to 2.8 specific gravity. The thinner can reduce oil-based mud viscosity to allow the drilling fluid to be re-used.

The thinner CZ11-35A solves the issue of high density oil-based mud having a very high viscosity because of high solid content. CZ11-35A can be added to a drilling mud comprising a high amount of weighting agent and/or solid cuttings. CZ11-35A effectively reduces the viscosity of the drilling fluid. In an embodiment, CZ11-35A lowers the viscosity of a high density oil-based mud at least when added at a concentration range of 0.03-1.6 wt % (0.25-12 ppb). In an embodiment, CZ11-35A lowers the viscosity of a high density oil-based mud at least when added at a concentration range of 0.01-5 wt %. CZ11-35A is more effective than the commercial thinner candidates evaluated and is easy to use.

In an embodiment, CZ11-35A is made from poly fatty amides from fatty acid or oil reacted with polyamines at 100-200° C., reacted with maleic acid from 80-150° C., and diluted with over 40% oleyl alcohol, fatty acid, or poly condensed fatty acid can be used to decrease oil-based mud viscosity at temperatures up to about 220-250° C. In an embodiment, the thinner is named CZ11-35A. In an embodiment, CZ11-35A can be 31-48% of (9E,9'E)-N,N'-(azanediylbis(ethane-2,1-diyl))bis(octadec-9-enamide); 25-42% of (Z)-4-(bis(2-((E)-octadec-9-enamido)ethyl)amino)-4-oxobut-2-enoic acid; and 15-22% (E)-N-(2-(2-((E)-heptadec-8-en-1-yl)-4,5-dihydro-1H-imidazol-5-yl)ethyl)octadec-9-enamide; and 5-60% oleyl alcohol, 5-20% oleic acid or 5-20% of castor oil. In an embodiment, the high temperature thinner allows the drilling fluid to be reused. In an embodiment, the mud weight (MW) is 2.4. In an embodiment, the MW is 2.8.

In an embodiment, CZ8-50A effectively reduces the viscosity of oil-based drilling fluid that has high solid content. CZ8-50A is a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid. In an embodiment, CZ8-50A provides a decrease in viscosity of the oil-based mud at low temperatures. In an embodiment, the low temperature thinner allows the drilling fluid to be reused.

CZ8-50A is also known as Hypermer LP1, obtained from Croda Inc, 300-A Columbus Circle, Edison, N.J. 08837. Croda promotes it as a polymeric dispersant and wetting agent. Hypermer LP-1 is a polymeric surfactant of high molecular weight exhibiting excellent solubility in both naphthenic and paraffinic mineral oils. It also imparts emulsion stabilizing characteristics. It is a waxy solid at 25° C. It is a non-ionic surfactant-ester that can function as an emulsifier and is water-miscible. CZ8-50A is a polycondensed fatty acid. It has a CAS No. of 58128-22-6.

CZ8-50A is a thinner that can reduce oil-based mud viscosity to allow the fluid to be reused if needed. The product can be added to a drilling mud to thin it or lower its viscosity in a concentration range of 0.03-0.2 wt % (0.25-1.5 ppb). In an embodiment, the concentration range is 0.03-2%. In an embodiment, the MW is 2.2. In another embodiment, the MW is 2.4. In an embodiment, the thinner may be used at a concentration of up to 2%. It may require dilution in field applications for ease of metering. The thinner is highly effective and has good biodegradability. It is much more effective than other thinner candidates evaluated.

In an embodiment, the thinner can be a compound of the formula (I):

$$R^1\text{-}[(AO_n\text{-}A\text{-}OR^2]_m \quad (I)$$

where:
$R^1$ is the residue of a group having at least m active hydrogen atoms where m is at least 2; AO is an alkylene oxide residue; each n is independently from 0 to 100; and each $R^2$ is independently H or an acyl group $COR^3$ where each $R^3$ is independently a residue of a polyhydroxyalkyl or polyhydroxyalkenyl carboxylic acid, a residue of a hydroxyalkyl or hydroxyalkenyl carboxylic acid and/or a residue of an oligomer of the hydroxyalkyl or hydroxyalkenyl carboxylic acid wherein on average at least 2 of $R_2$ is an acyl group. US2013/0079536.

In an embodiment, the oil-based drilling fluid comprises 50-100% oil; 1-5% viscosifier; 20-70% weighting agent; 5-10% fluid loss additives; 0-5% lime; 0-30% brine; and 0.3-10% emulsifiers. In an embodiment, the emulsifier is 0.3-5%. In an embodiment, the brine is present at 5-25%. In an embodiment, the brine is a chloride, bromide, potassium, iodine, formate, sodium, calcium, zinc salt or combination thereof. In an embodiment, the brine is $CaBr_2$, $CaCO_3$, $CaCl_2$, NaCl, $ZnBr_2$, KCl, or combinations thereof.

Viscosity can be measured by methods including, but not limited to, a funnel or a rotating viscometer. The rotating viscometer provides PV and YP. The rotating viscometer turns a rotor sleeve at various revolutions per minute in a container of mud. The torque on the mud is measured by a concentric bob. The measurements at various revolutions per minute allows determination of the plastic viscosity (PV) and yield point (YP). According to Bingham plastic model, PV=⊖600−⊖300; YP=PV−⊖300; ⊖600 and ⊖300 are the shear stress readings at 600 rpm and 300 rpm.

EXAMPLES

Example 1

Several thinner candidates were evaluated in four different mud systems that differed only in thinner. The emulsifier and other components of the systems were the same. The mud viscosities were then measured on before (BF) and after (AF) addition of thinner candidate. The measurements were performed at 6 shear rates of 600, 300, 200, 100, 6, and 3 rpm. The test temperature was 150° F. The PV and YP were calculated.

It can be seen from Table 1 that CZ8-50A exhibits superb performance, significantly lowering the viscosities of mud 1 at all shear rates. CZ8-50B and CZ2-4A did not reduce the mud viscosities and instead increased viscosities. CZ2-5B showed some viscosity reduction but not to the same magnitude as CZ8-50A. CZ8-50A is a polycondensed fatty acid that is selected from the group consisting of 12-hydroxystearic acid, 12-hydroxyoctadecanoic acid, polyhydroxystearic acid, reaction products with stearic acid, octadecanoate, octadecanoic acid, and homopolymers of stearic acid; CZ8-50B is Stepan, Bio-soft® N25-7 which is a linear alcohol (C12-15) ethoxylate POE-7, liquid; CZ2-5B is a CNPC USA, fatty imidazline; CZ2-5B is (Z)-4-((2-(2-((E)-heptadec-8-en-1-yl)-4,5-dihydro-1H-imidazol-1-yl)ethyl) amino)-4-oxobut-2-enoic acid (70%) with 30% butanol; and CZ2-4A is Akzo Nobel, Berol® 840 which is poly(oxy-1,2-ethanediyl), a-(2-ethylhexy)-w-hydroxy-. HT EA 20 is a mixture of a fatty cross-linked polyamide with oleyl alcohol and oleic acid. It is 20% oleic acid; 20% oleyl alcohol; 20% of 1,3-dihydroxypropan-2-yl (E)-12-hydroxyoctadec-9-enoate; 8% of each (9E, 9'E)-N,N'-(azanediylbis(ethane-2,1-diyl))bis(12-hydroxyoctadec-9-enamide); (E)-12-hydroxy-N,N-bis(2-((E)-12-hydroxyoctadec-9-enamido)ethyl) octadec-9-enamide; (Z)-4-bis(2-((E)-12-hydroxyoctodec-9-enamido)ethyl) amino)-4-oxobut-2-enoic acid; 1,3-dihyroxypropan-2-yl(Z)-4-(bis(2-((E)-12-hydroxyoctadec-9-enamido)ethyl) amino)-4-oxobut-2-enoate; and $N^1$, $N^1$, $N^4$, $N^4$-tetrakis(2-((E)-12-hydroxyoctadec-9-enamido) ethyl)maleamide.

TABLE 1

Comparison of CZ8-50A with other thinner candidates.

| | Mud | | | | | | | | | | | |
|---|---|---|---|---|---|---|---|---|---|---|---|---|
| | 1 | | | 2 | | | 3 | | | 4 | | |
| | Emulsifier | | | | | | | | | | | |
| | HT EA 20 | | | HT EA 20 | | | HT EA 20 | | | HT EA 20 | | |
| | Thinner | | | | | | | | | | | |
| | 0.5 ppb CZ8-50A | | | 0.5 ppb CZ8-50B | | | 1.0 ppb CZ2-53 | | | 1.0 ppb CZ2-4A | | |
| Rheology | BF | AF | % change | BF | AF | % change | BF | AF | % change | BF | AF | % change |
| 600 rpm | 169.1 | 122.1 | −27.79 | 122.8 | 162.9 | 32.65 | 162.9 | 144 | −11.60 | 159.2 | 190.3 | 19.54 |
| 300 rpm | 109.5 | 70.4 | −35.71 | 71.1 | 94.2 | 32.49 | 94.2 | 82.3 | −12.63 | 100.9 | 118.8 | 17.74 |
| 200 rpm | 86.6 | 52.1 | −39.84 | 53.3 | 69 | 29.46 | 69 | 59.9 | −13.19 | 78.4 | 82.3 | 4.97 |
| 100 rpm | 61 | 31.6 | −48.20 | 33.6 | 42.1 | 25.30 | 42.1 | 36.1 | −14.25 | 53.8 | 62.6 | 16.36 |
| 6 rpm | 25.5 | 6 | −76.47 | 9.3 | 10.2 | 9.68 | 10.2 | 7.6 | −25.49 | 20.2 | 22.9 | 13.37 |
| 3 rpm | 23.1 | 4.1 | −82.25 | 7.8 | 8 | 2.56 | 8 | 5.9 | −26.25 | 18.3 | 20.8 | 13.66 |
| PV | 60 | 50 | −16.67 | 51.2 | 68.4 | 33.59 | 68.4 | 63.6 | −7.02 | 59.3 | 72.7 | 22.60 |
| YP | 48.5 | 19.8 | −59.18 | 19.5 | 25.8 | 32.31 | 25.8 | 19 | −26.36 | 41.3 | 46.6 | 12.83 |
| 10" | 24.6 | 5.5 | −77.64 | 9.6 | 10.3 | 7.29 | 10.3 | 7.9 | −23.30 | 21.1 | 23.5 | 11.37 |
| 10' | 29.6 | 9.6 | −67.57 | 13.8 | 15.9 | 15.22 | 15.9 | 11.2 | −29.56 | 30.7 | 33.5 | 9.12 | ppb = pounds per barrel

FIG. 1 plots the yield point comparison of before (BF) and after (AF) addition of thinner candidates According to FIG. 1, CZ8-50A reduced the yield point the greatest of the candidates tested.

Example 2

Figure 2:
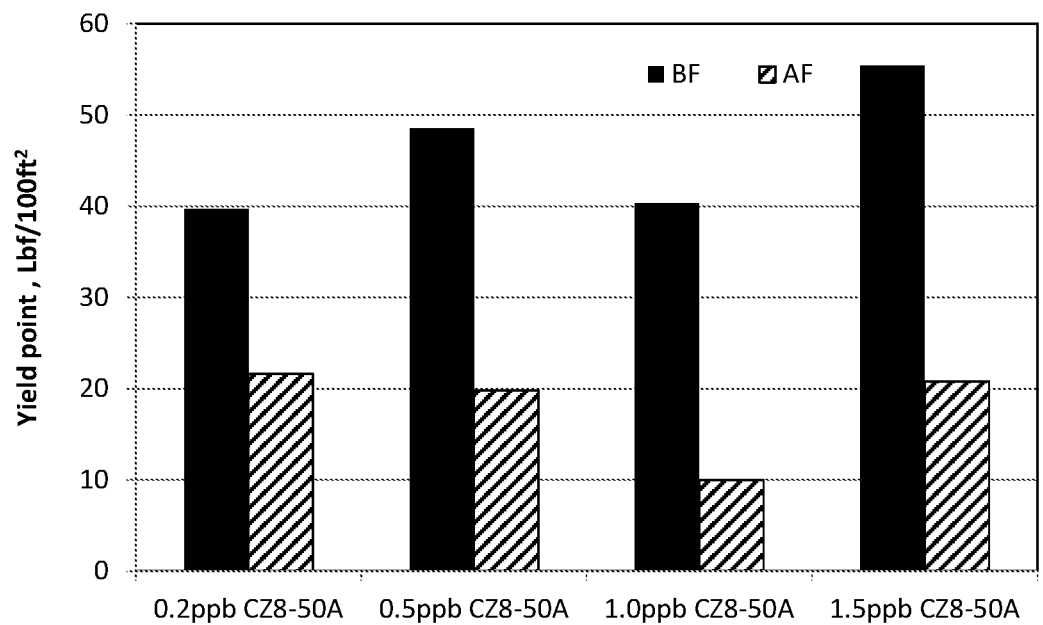
FIG. 2 plots the yield point comparison of before (BF) and after (AF) addition of different concentrations of CZ8-50A.

CZ8-50A performed well in different concentrations to effectively reduce mud viscosities. FIG. 2 plots the yield point comparison of before (BF) and after (AF) addition of different concentrations of CZ8-50A. According to FIG. 2, the greatest reduction in yield point after addition of CZ8-50A was at 1.5 ppb.

According to Table 2, all concentrations of CZ8-50A tested effectively reduced the viscosity of the mud. In Table 2, the best concentration of CZ8-50A for reducing mud viscosity of those tested is 1.0338 g/350 ml mud.

TABLE 2

Performance of CZ8-50A in different concentrations (g/350 mL mud).

| | Mud | | | | | | | | | | | |
|---|---|---|---|---|---|---|---|---|---|---|---|---|
| | 5 | | | 2 | | | 6 | | | 7 | | |
| | Emulsifier | | | | | | | | | | | |
| | HT EA 20 | | | HT EA 20 | | | HT EA 20 | | | HT EA 20 | | |
| | Thinner | | | | | | | | | | | |
| | 0.2071 g CZ8-50A | | | 0.512 g CZ8-50A | | | 1.0338 g CZ8-50A | | | 1.5020 g CZ8-50A | | |
| Rheology | BF | AF | % change | BF | AF | % change | BF | AF | % change | BF | AF | % change |
| 600 | 145.3 | 124.1 | −14.59 | 169.1 | 122.1 | −27.79 | 150.2 | 123.5 | −17.78 | 192.3 | 121.4 | −36.87 |
| 300 | 93 | 73.5 | −20.97 | 109.5 | 70.4 | −35.71 | 94.7 | 66.8 | −29.46 | 123.8 | 71.3 | −42.41 |
| 200 | 73.1 | 55.2 | −24.49 | 86.6 | 52.1 | −39.84 | 75.8 | 47.8 | −36.94 | 100.3 | 53.3 | −46.86 |
| 100 | 50.8 | 35.1 | −30.91 | 61 | 31.6 | −48.20 | 53.6 | 27.9 | −47.95 | 72.3 | 33.9 | −53.11 |
| 6 | 19.9 | 10.1 | −49.25 | 25.5 | 6 | −76.47 | 24.3 | 6.1 | −74.90 | 31.9 | 9.6 | −69.91 |
| 3 | 18 | 8.9 | −50.56 | 23.1 | 4.1 | −82.25 | 22.1 | 5.2 | −76.47 | 29.3 | 8.1 | −72.35 |
| PV | 52.8 | 51.9 | −1.70 | 60 | 50 | −16.67 | 56.3 | 55 | −2.31 | 68.5 | 49.9 | −27.15 |
| YP | 39.7 | 21.6 | −45.59 | 48.5 | 19.8 | −59.18 | 40.3 | 10 | −75.19 | 55.4 | 20.8 | −62.45 |
| 10" | 19.1 | 13.1 | −31.41 | 24.6 | 5.5 | −77.64 | 23.9 | 7.5 | −68.62 | 30.5 | 8.5 | −72.13 |
| 10' | 23.5 | 22.2 | −5.53 | 29.6 | 9.6 | −67.57 | 28 | 15.1 | −46.07 | 36.6 | 12 | −67.21 |

Example 3

Synthesis and Formulation:

CZ00008-73-1 fatty diamide: 1000 g (3.55 mol) of oleic acid was added to a 2 liter round bottom flask with 4 necks, an agitation blade, a temperature probe, a distillation receiver with condenser, and an additional funnel. The acid was heated to 70° C. with agitation and a small nitrogen purge. $N_2$ purging was stopped when the temperature reached 70° C. Diethylenetriamine (DETA) (181.9 g, 1.77 mol) was slowly added while keeping the temperature to less than 120° C. The DETA addition took approximately 1 hr to finish. After DETA addition, the reactants were heated to 150° C.-160° C. while watching for evaporation of water. After 2 hrs or when no more water evaporated, the reaction was cooled down and mineral spirits 365 (solvent 365), 237.5 g were added to dilute to 80% activity.

CZ00008-73-4 triamide from maleic anhydride (MA): 151.46 g MA (1.55 mol) was added slowly to 70° C. CZ00008-73-1, holding the temperature to less than 100° C. It took about 1.5 hr to finish the MA addition. The temperature was at 76° C. The reaction was heated for 1 hr at 80-85° C. Then 191 g of solvent 365 was added to dilute the product to 70% activity and unload the product.

Figure 3:
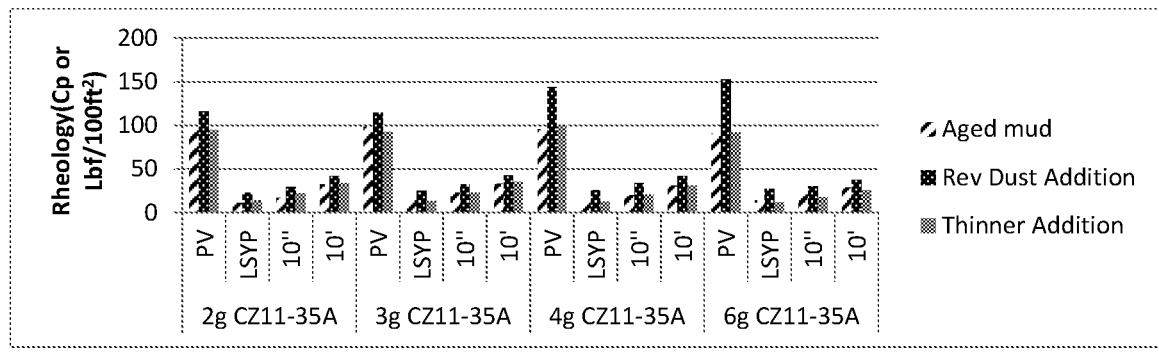
FIG. 3 plots the plastic viscosity (PV), low-shear yield point (LSYP), 10" and 10' gel strength addition of the evaluation of different amounts of the thinner candidate.

CZ11-35A thinner candidate: In a 50 mL sample bottle, 10.15 g of CZ00008-73-4 was added to 7.6 g oleyl alcohol and mixed well. LC-MS was used to analyze the final composition of CZ11-35A. FIG. 3 shows LC-MS results for CZ11-35A.

FIG. 3 plots the PV, LSYP, 10" and 10' gel strength addition of the evaluation of 2 g, 3 g, 4 g, and 6 g of the thinner candidate CZ11-35A.

Example 4. Mud Tests

Thinner candidates, including CZ11-35A, were evaluated in different mud systems with a mud weight of 2.4. The emulsifier and other components of the systems were the same.

To simulate the well conditions, the 2.4 MW drilling fluids were prepared and aged at 225° C. Rev Dust™ was added to simulate the presence of cuttings. Rev Dust™ is a friction reducing material composed of very small particles that is composed of calcium montmorillonite clay. The rheology increased after the Rev Dust™ addition. The thinner candidate, CZ11-35A, or other commercial samples, are added to bring the rheology back to the level before Rev Dust™ addition.

The mud viscosities are reported in Table 3 for aged mud, after the Rev Dust™ addition, and after the thinner addition. The measurements were performed at 6 shear rates of 600, 300, 200, 100, 6, and 3 rpm. The rheology test temperature was 150° F. The PV and LSYP were calculated. (PV=R600-R300; R600=dial reading at 600 revolutions per minutes, expressed in degrees deflection; R300=dial reading at 300 revolutions per minutes, expressed in degrees deflection; LSYP=2*R3-R6, R3=dial reading at 3 revolutions per minutes, expressed in degrees deflection; R6=dial reading at 6 revolutions per minutes, expressed in degrees deflection). Table 4 depicts the results. Diesel only lowered the PV. It is not as efficient as the thinner.

TABLE 3

Comparison of the thinning effect of thinner candidate CZ11-35A with different usage amounts.

| | Mud | | | | | | | | | | | |
|---|---|---|---|---|---|---|---|---|---|---|---|---|
| | SY11-M-39-1 | | | SY11-M-49-2 | | | SY11-M-39-2 | | | SY11-M-49-3 | | |
| | Emulsifier | | | | | | | | | | | |
| | CZ8-74A/CZ9-37 | | | CZ8-74A/CZ9-37 | | | CZ8-74A/CZ9-37 | | | CZ8-74A/CZ9-37 | | |
| | Thinner | | | | | | | | | | | |
| | 2 g CZ11-35A | | | 3 g CZ11-35A | | | 4 g CZ11-35A | | | 6 g CZ11-35A | | |
| Rheology | Aged Mud | Rev Dust Add | Thin Add | Aged Mud | Rev Dust Add | Thin Add | Aged Mud | Rev Dust Add | Thin Add | Aged Mud | Rev Dust Add | Thin Add |
| 600 | 211.4 | 260.9 | 231 | 212.3 | 269.1 | 212.9 | 214.2 | 315 | 236.1 | 216.3 | 315.9 | 215.5 |
| 300 | 119.1 | 150.1 | 131.3 | 120.7 | 154.3 | 123.6 | 122.3 | 177 | 133.3 | 123 | 173.5 | 124.1 |
| 200 | 85.6 | 126.8 | 97.7 | 90.8 | 115.4 | 91.2 | 89.3 | 130 | 98.8 | 89.2 | 130.9 | 92.4 |
| 100 | 50.2 | 78.1 | 60.4 | 56.1 | 72.7 | 56.7 | 53.7 | 81.8 | 60.8 | 54.3 | 78.4 | 57.2 |
| 6 | 13.6 | 25.1 | 18.1 | 17.8 | 27.5 | 17.8 | 15.8 | 30 | 17.2 | 16.7 | 27.6 | 15.5 |
| 3 | 12.3 | 23.9 | 16.2 | 16.2 | 26.4 | 15.4 | 14.3 | 28 | 14.9 | 15.5 | 27.3 | 13.7 |
| PV | 95.8 | 116 | 94.9 | 98.1 | 114.2 | 92.3 | 95.3 | 143.9 | 100.5 | 90.4 | 152.3 | 91.6 |
| LSYP | 11 | 22.7 | 14.3 | 14.6 | 25.3 | 13 | 12.8 | 26 | 12.6 | 14.3 | 27 | 11.9 |
| 10" | 17.2 | 29.4 | 22.2 | 22.8 | 32.7 | 22.8 | 20.1 | 33.9 | 20.7 | 20.9 | 30 | 17.7 |
| 10' | 32.5 | 42 | 34 | 32.9 | 42.7 | 35.4 | 31 | 42.3 | 31.3 | 28.9 | 37.8 | 26.1 |

TABLE 4

Comparison of the thinning effect of thinner candidate CZ11-35A with different usage amount.

| | Mud | | | | | | | | |
|---|---|---|---|---|---|---|---|---|---|
| | SY11-M-36-4 to 36-5 | | | SY11-M-40-3 Thinner | | | SY11-M-49-4 | | |
| | 9.5 ml Diesel | | | 2 g CZ11-35B | | | 8 g CZ11-35A | | |
| Rheology | Thick Mud | Thinner Add | % Change | Thick Mud | Thinner Add | % Change | Thick Mud | Thinner Add | % Change |
| 600 | 340 | 255 | −25.00 | 316.4 | over | | over | 223.3 | |
| 300 | 188.4 | 146.2 | −22.40 | 171 | 201.1 | 17.60 | 173.5 | 126.4 | −27.15 |
| 200 | 143 | 110.2 | −22.94 | 133.7 | 159 | 18.92 | 134.9 | 92.6 | −31.36 |
| 100 | 90.6 | 72.5 | −19.98 | 83.8 | 99.5 | 18.74 | 78.5 | 56.3 | −28.28 |
| 6 | 36.9 | 33.6 | −8.94 | 27.3 | 36.6 | 34.07 | 20.6 | 14 | −32.04 |
| 3 | 35.5 | 32.8 | −7.61 | 25.2 | 34.9 | 38.49 | 19.5 | 11.4 | −41.54 |
| PV | 144.7 | 107.1 | −25.98 | 139 | | | | 101.7 | |
| LSYP | 34.1 | 32 | −6.16 | 23.1 | 33.2 | 43.72 | 18.4 | 8.8 | −52.17 |
| 10" | 37.5 | 35.9 | −4.27 | 32.1 | | | | 15.7 | |
| 10' | 45.6 | 42.6 | −6.58 | 46.2 | | | | 25.1 | |

After the Rev Dust™ addition, the amount of usage of the thinner candidate CZ11-35A can be adjusted to bring the rheology back to the original viscosity (before the Rev Dust™ addition). From this example, it can be concluded that CZ11-35A exhibits superb performance, significantly lowering the viscosities of drilling fluids at all shear rates. Table 4 lists the rheology results comparing CZ11-35A with diesel dilution and other samples, such as CZ11-35B. In an embodiment, the rheology of Acme Wax 224™ can be compared to CZ11-35A. CZ11-35A can bring back the viscosity of very thick mud (even mud that it is too thick to measure) back to its viscosity before Rev Dust™ addition.

Figure 4:
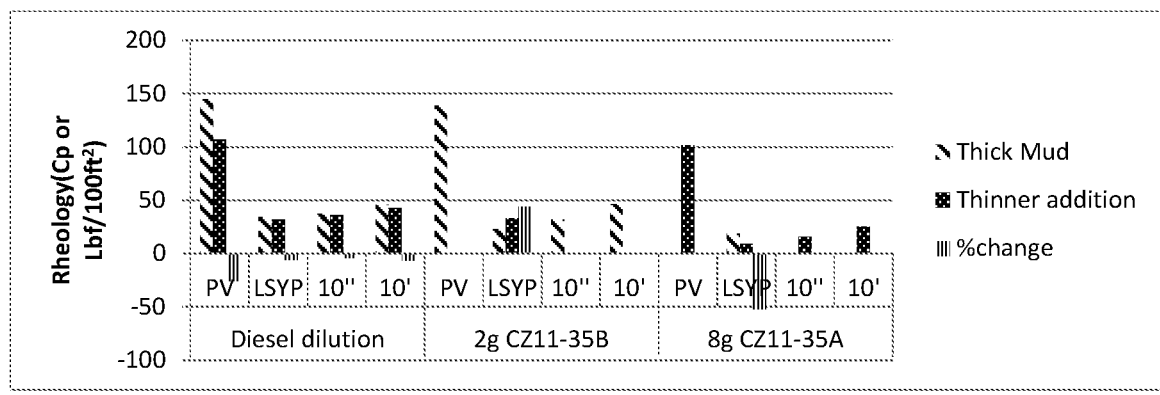
FIG. 4 plots the PV, LSYP, 10" and 10' gel strength addition of the evaluation of different thinner candidates.

FIG. 4 plots the PV, LSYP, 10" and 10' gel strength addition of the evaluation of different thinner candidates. The results demonstrate that CZ11-35A can lower the rheology a sufficient amount for real well application.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

REFERENCES

US2013/0079536

What is claimed is:

1. A method of decreasing viscosity of an oil-based drilling fluid composition comprising
    a) adding a thinner to the oil-based drilling fluid to form an oil-based drilling fluid composition; wherein the thinner is produced by reacting a poly fatty amide with maleic acid to form a product, and diluting the product with a compound selected from the group consisting of an oleyl alcohol, a fatty acid, and a poly condensed fatty acid;
    b) injecting the oil-based drilling fluid composition into a wellbore; and
    c) retrieving the oil-based drilling fluid composition as it returns to the surface;
wherein the thinner is present in said drilling fluid composition in a range of 0.03-1.5% weight percent wherein the poly fatty amide is made from a fatty acid or an oil reacted with polyamines at a temperature range of 100–190° C.; wherein the compound is present in said drilling fluid composition in the range of about 50% to 100% weight percent.

* * * * *